Patented Mar. 10, 1942

2,276,117

UNITED STATES PATENT OFFICE 2,276,117

SUBSTITUTED PHENOLS

Fred Lowell Taylor and John E. Livak, Midland, Mich., assignors to The Dow Chemical Company, Midland, Mich., a corporation of Michigan No Drawing. Application April 27, 1940, Serial No. 331,947

1 Claim. (Cl. 260—619)

This invention relates to new substituted phenols, and in particular concerns substituted phenols containing two different substituents, one of which is an α-phenylethyl group occupying a position ortho or para to the hydroxyl group and the other of which is a higher alkyl or cycloalkyl group. Such compounds may be represented by the general formula

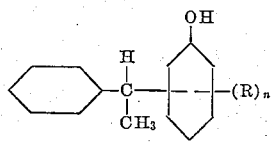

wherein R represents an alkyl or cycloalkyl group containing at least 4 carbon atoms and n represents an integer not greater than three, and the α-phenylethyl group occupies a position ortho or para to the hydroxyl group. These compounds are usually obtained as high-boiling viscous liquids, although in some cases they may occur as resinous or crystalline solids. They are substantially insoluble in water but are readily dissolved by organic solvents such as methanol, acetone, chlorobenzene, ethanol, etc. Certain of these compounds may be employed in the manufacture of phenol-aldehyde condensation products, and all of them are valuable intermediates in the preparation of plasticizing agents, wetting agents, and other organic chemicals.

The new compounds of the present class may be prepared by direct reaction between an α-haloethylbenzene, such as α-chloroethylbenzene or α-bromoethylbenzene, or styrene and a higher alkyl or cycloalkyl substituted phenol having an open position ortho or para to the hydroxyl group, e. g. 4-tertiarybutylphenol, 2-cyclohexylphenol, 3-amylphenol, 2,4-di-tertiarybutylphenol, 2,3,6-n-butylphenol, 4-cyclopentylphenol, 2-laurylphenol, etc. When styrene is employed as one of the reactants, there should be present in the reaction mixture an acid catalyst, such as hydrogen chloride, to promote the condensation reaction. A particularly convenient method of preparing the new compounds consists in reacting a mixture of styrene and an α-haloethylbenzene with the substituted phenol, whereby the hydrogen halide formed by the reaction between the α-haloethylbenzene and the phenol acts as the catalyst for the reaction between the styrene and phenol. The temperature at which such reaction takes place varies somewhat with the particular reactants employed but is usually between about 100° C. and about 200° C. Upon completion of the reaction, the substituted phenol product is recovered from the reaction mixture and purified by distillation under reduced pressure or by crystallization from a suitable solvent.

The following example illustrates the preparation of one of the compounds of the present class but is not to be construed as limiting the invention.

Example

In a flask fitted with a dropping funnel, stirrer, thermometer, and a reflux condenser, a mixture of 600 grams (4.0 moles) of 4-tertiary-butylphenol and 21 grams (0.15 mole) of α-chloroethylbenzene was heated to 160° C. and 832 grams (8.0 moles) of styrene was added gradually over a period of 1¼ hours. The temperature was then gradually increased to 190° C. over a period of 7 hours, after which the reaction mixture was fractionally distilled under reduced pressure. α-phenylethyl-4-tertiarybutylphenol was obtained as a viscous liquid distilling at approximately 145°–160° C. under 2 millimeters pressure and having a specific gravity of about 1.00 at 25/25° C. This product may be represented by the formula

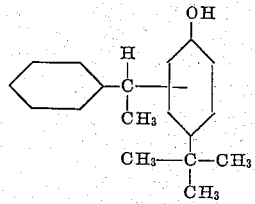

Other compounds of the present class which may be prepared in a similar manner are: 2-(α-phenylethyl)-4-tertiaryamylphenol, 4-(α-phenylethyl)-2-cyclohexylphenol, 4-(α-phenylethyl)-3-hexylphenol, 4-(α-phenylethyl)-2-laurylphenol, 2-(α-phenylethyl)-4-cycloheptylphenol, 2-(α-phenylethyl)-4,6-di-amylphenol, etc.

Other modes of applying the principle of our invention may be employed instead of those explained, change being made as regards the materials and methods disclosed, provided the product stated by the following claim or the equivalent of such stated product be obtained.

We claim:

A substituted phenol having the general formula

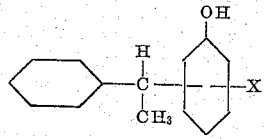

wherein X represents a cycloalkyl radical selected from the class consisting of the cyclopentyl and cyclohexyl radicals and the α-phenylethyl substituent occupies one of the positions ortho and para to the hydroxyl group.

FRED LOWELL TAYLOR.
JOHN E. LIVAK.